April 7, 1931.  J. R. WORMLEY  1,799,772
MOTOR AND POWER TRANSMISSION APPARATUS
Filed June 7, 1922  7 Sheets-Sheet 1

Fig. 1.

Inventor
J. R. WORMLEY.
By his Attorney

April 7, 1931.    J. R. WORMLEY    1,799,772
MOTOR AND POWER TRANSMISSION APPARATUS
Filed June 7, 1922    7 Sheets-Sheet 2

Inventor:
Jonathan R. Wormley
By Gillson, Mann & Cox
Attys.

April 7, 1931.　　　J. R. WORMLEY　　　1,799,772
MOTOR AND POWER TRANSMISSION APPARATUS
Filed June 7, 1922　　　7 Sheets-Sheet 3

Inventor
J. R. WORMLEY.
By his Attorney

April 7, 1931.  J. R. WORMLEY  1,799,772
MOTOR AND POWER TRANSMISSION APPARATUS
Filed June 7, 1922   7 Sheets-Sheet 4

Inventor
J. R. WORMLEY.
By his Attorney

April 7, 1931. J. R. WORMLEY 1,799,772
MOTOR AND POWER TRANSMISSION APPARATUS
Filed June 7, 1922 7 Sheets-Sheet 6

Inventor
J. R. WORMLEY.
By his Attorney

April 7, 1931.　　　J. R. WORMLEY　　　1,799,772
MOTOR AND POWER TRANSMISSION APPARATUS
Filed June 7, 1922　　　7 Sheets-Sheet 7

Inventor
J. R. WORMLEY
By his Attorney

Patented Apr. 7, 1931

1,799,772

UNITED STATES PATENT OFFICE

JONATHAN R. WORMLEY, OF RANSOM, ILLINOIS

MOTOR AND POWER TRANSMISSION APPARATUS

Application filed June 7, 1922. Serial No. 566,539.

This invention relates to motors, and more particularly to combustion engines, and the principal object of the invention is the provision of new and improved means for converting reciprocating movement into rotary movement.

Another object of the invention is the provision of an apparatus of this character which is of such construction as to embody means for reducing friction of the working elements, whereby wear and tear on the pistons and cylinders is reduced to a minimum.

In the practice of my invention, for the attainment of these and other objects, I employ for each power cylinder element of my apparatus, a spirally grooved fixed cylindrical element hereinafter referred to as a stator; a spirally grooved rotative cylindrical element hereinafter referred to as a rotor; a reciprocative and rotative plunger element mounted on a reciprocative piston rod and having peripheral roller bearings for engaging the grooves of the stator and rotor, whereby rotative and reciprocative movement may be coincidentally transmitted from one element to the other; a plurality of pistons, mounted on the reciprocative piston-rod; and other novel features which will be fully disclosed as this description progresses and specifically set forth in the appended claims.

In the accompanying drawings forming a part of this specification.

Figure 1:
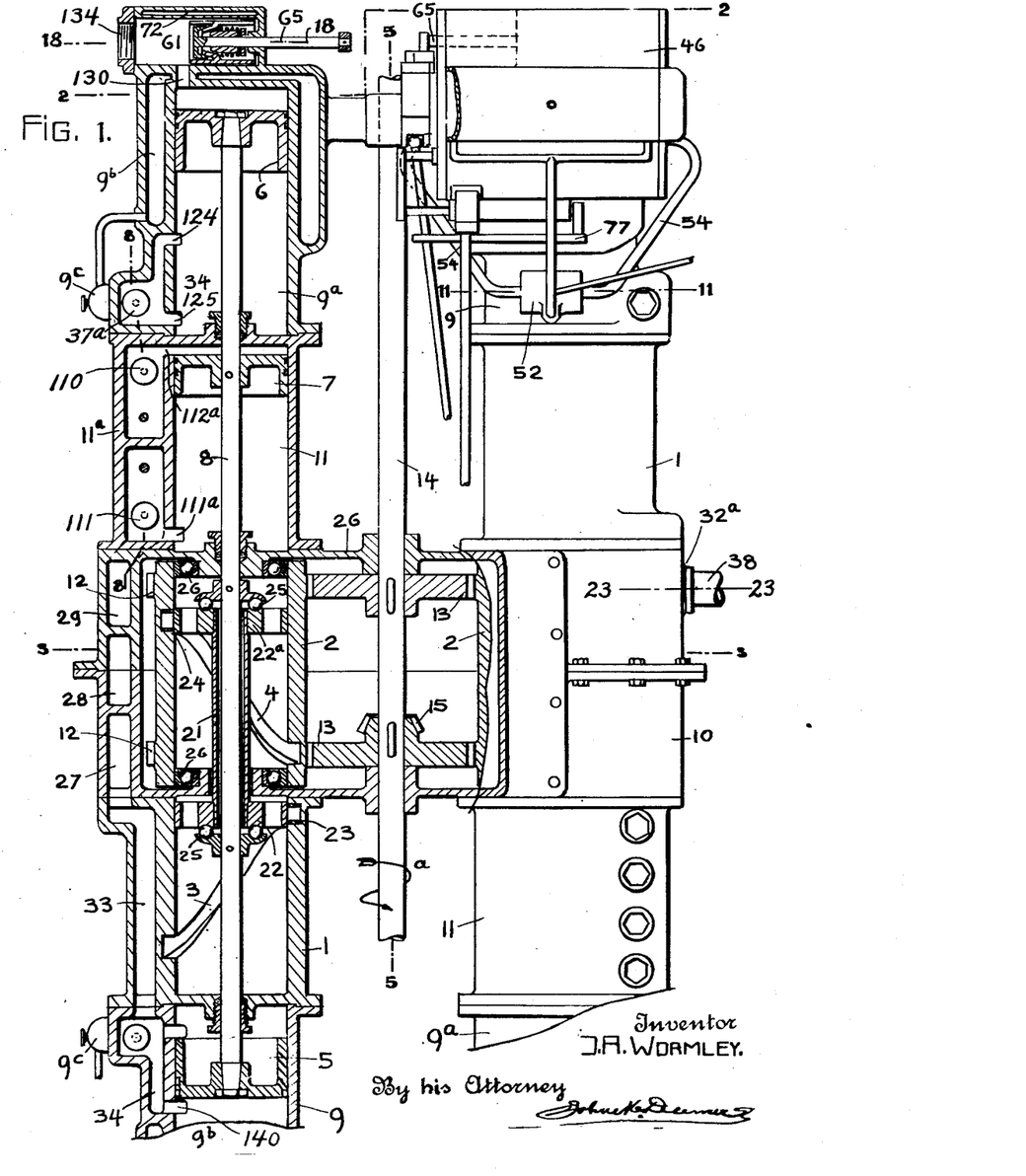
Figure 1 is a plan view, shown partly in elevation and partly in section, illustrating an example of my improved apparatus, the section being taken on the line 1—1 of Fig. 2.

In the example of my invention illustrated by the drawings, 1 indicates a cylinder section constituting the stator or fixed element of my improved power transmission device, 2 indicates the rotor, and 3, 4 the spiral grooves located, respectively, in the stator 1 and rotor 2, and 5, 6 and 7 indicate pistons mounted on a common piston rod 8, the piston 5 operating in a cylinder section 9 constituting a working or expansion chamber, the piston 6 operating in a cylinder section 9ª constituting another working or expansion chamber, and the piston 7 operating in a cylinder section 11 which constitutes an air pump. The cylinders 9 and 9a are provided with the usual water jackets 9b. The parts are duplicated at each side of the device, and in order to balance the operating mechanism the arrangement of the members 9a, 11, 1 and 9 as shown in section in Fig. 1 is reversed at the right of said figure. Since the parts at opposite sides of the device are duplicates, only those at one side need be described. The rotors 2 are respectively provided with fixed peripheral gear wheels 12 which mesh with similar gear wheels 13 mounted on a drive shaft 14, whereby, when the engine is operated, said shaft is given continuous rotary movement in the direction of the arrow a, Fig. 1 of the drawings.

One of the gear wheels 13, see Figs. 1 and 5, has an integrally formed bevel gear wheel 15 which meshes with a bevel gear wheel 17 mounted on a vertical shaft 18 which carries rotary cam wheels 19 and 20 for automatically operating the control mechanism hereinafter described.

Mounted on the piston rod 8 is the reciprocative and rotative plunger element comprising a sleeve 21 having fixed thereon perforated heads 22, 22a, the head 22 having a roller bearing 23, for engaging within the groove 3 of the stator 1, and the head 22a having a roller bearing 24 for engaging the groove 4 of the rotor 2, said roller bearings being located diametrically opposite each other, in order to give a proper balance.

Each of the grooves 3 and 4 extends through 360° and since one of the grooves is on the stator 1 and the other on the rotor 2 the rotor will be given a complete rotation for each stroke of the piston rod 8. As a means for mounting the plunger element on the shaft 8, whereby it may rotate without undue friction, I provide suitable antifriction bearings, as ball bearings 25. The rotor 2 is also mounted on adaptable antifriction bearings, as ball bearings 26.

The rotors and their connected gearing are mounted within a gear case 10 which is adapted to contain oil for lubricating the operating parts. The piston 7 of the air pump 11 is mounted on the piston rod 8 and the manner in which the air enters the pump and is discharged therefrom will now be described.

Figure 8:
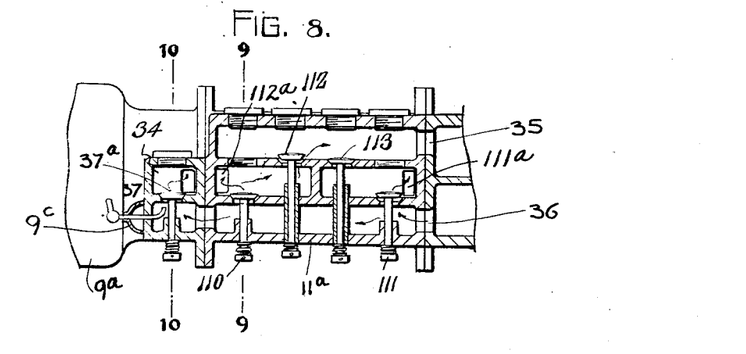
Fig. 8 is a fragmentary sectional view taken on the line 8—8 of Fig. 1.
Figure 9:
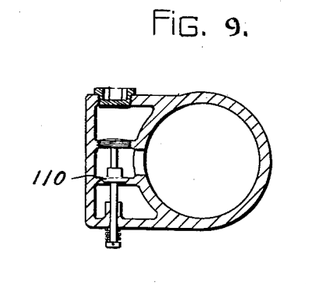
Fig. 9 is a cross-sectional view taken on the line 9—9 of Fig. 8.
Figure 10:
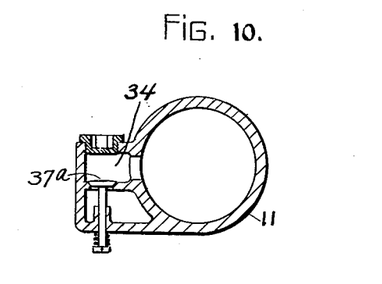
Fig. 10 is a cross-sectional view taken on the line 10—10 of Fig. 8.

The casing 10 is provided with an air intake compartment 28 extending transversely of the power unit. The compartment 28 is in communication with passages 36 at each side of the unit, that extend longitudinally of the unit, Figs. 1, 3 and 8, for supplying air to the pumps 11 and to the inner ends of the cylinders 9 and 9a at each side of the unit, for scavenging said cylinders as will presently appear. Air enters the compartment 28 through the port 32. Suitable air discharge passages 35 for the pumps 11 are also provided. These passages extend longitudinally of the unit alongside the intake passages 36, see Fig. 8. The passages 35 are in communication with a compartment 29 which is provided with an outlet port 32a, Fig. 1, in which is secured the tube 38 for conducting the compressed air to the air reservoir 39, Fig. 13. The compartment 28 and its passages 36 are not in communication with the compartment 29 and its communicating passages 35. An off-set passage 33 connects the passage 35 with the compartment 29 across the passage 36, see Fig. 23, whereby compressed air from the passage 35 may pass into the compartment 29 and through the pipe 38 into the tank 39.

The air pumps 11 are double acting and consequently two sets of intake valves 110 and 111 and two sets of exhaust or outlet valves 112 and 113 are employed for each pump. In the operation of each pump 11, when its piston 7 moves outward or to the left relative to Fig. 8, air enters through the port 32 and is drawn through the compartment 28 along the passage 36, Fig. 8, through the intake valve 111 and through the port 111a into the cylinder of the pump 11. Simultaneously, air compressed by the piston 7 is forced out through the port 112a, valve 112 and the passage 35 into the compartment 29 and along the pipe 38 into the reservoir. When the piston 7 moves to the right, air enters through the passage 36, valve 110 and port 112a and is discharged through the port 111a and valve 113.

Figures 2, 23:
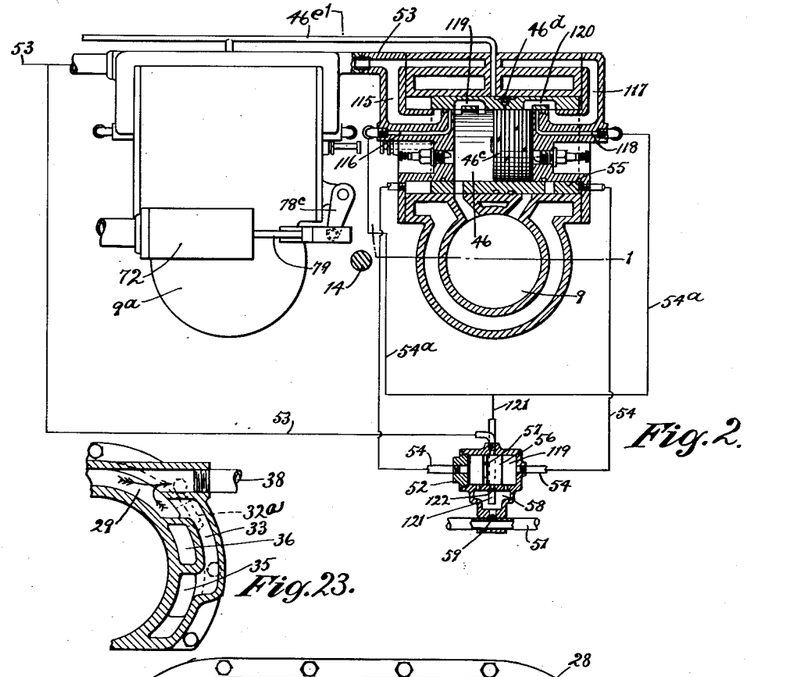
Fig. 2 is a cross-sectional view taken on the line 2—2 of Fig. 1.
Fig. 23 is a section on line 23—23 of Fig. 1.
Figure 3:
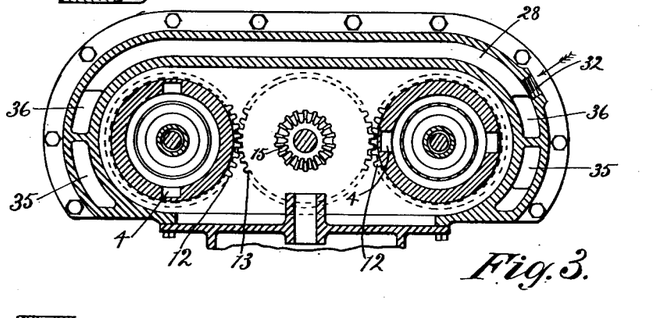
Fig. 3 is a cross-sectional view taken on the line 3—3 of Fig. 1.
Figure 13:
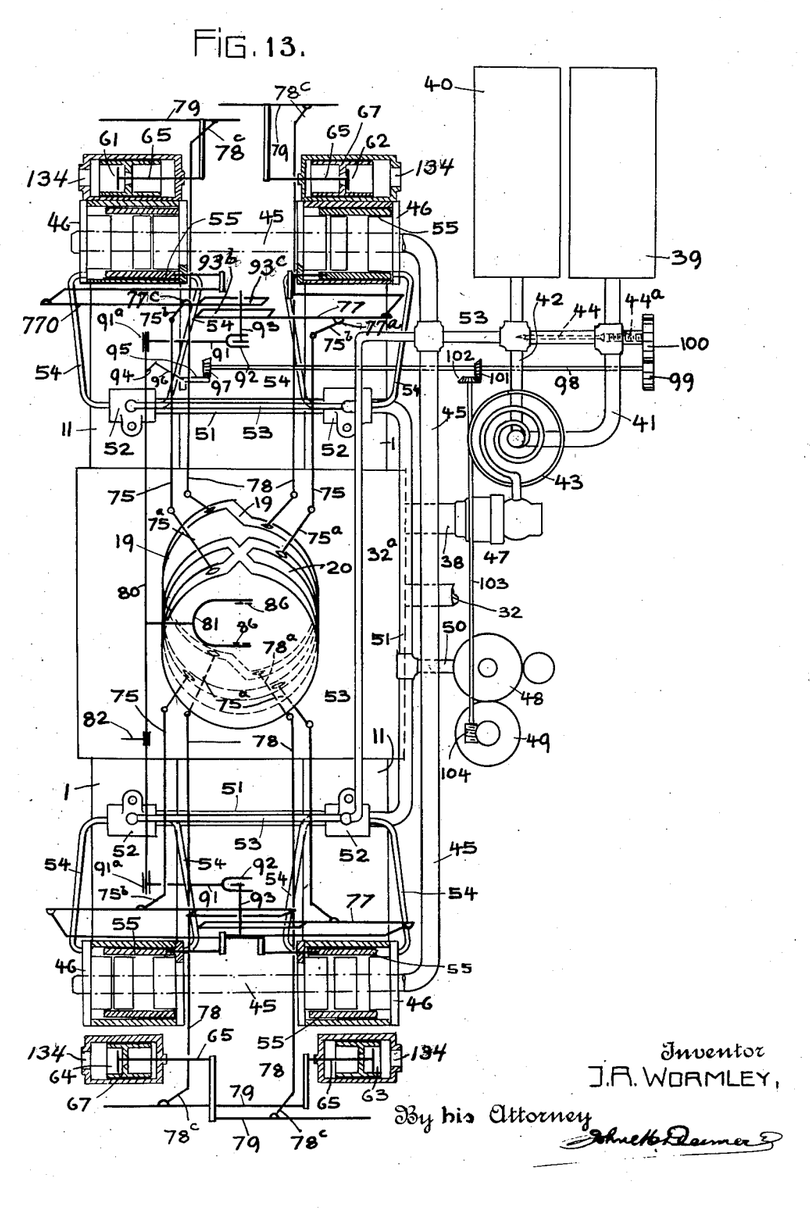
Fig. 13 is a diagrammatic view of the apparatus.

In the diagrammatic view illustrated by Fig. 13, 38 indicates the compressed air pipe communicating with the air outlet 32a of the gear case, see Fig. 23, said pipe being connected to two air tanks 39, 40 by means of tubes 41, 42, a suitable condenser, such as a copper coil 43, being interposed between the air tanks and the pipe 38, said condenser being adapted to be cooled in any suitable manner, as may be desired, for the purpose of condensing any oil vapor that may be carried over by the air pumps. 44 indicates a needle valve having a screw thread 44a, said valve being adapted to control the amount of air that will pass into the tank 40 causing a high pressure to be stored in the tank 39 through the pipe 41. 45, see Fig. 13, indicates the main compressed air feed pipe leading to the combustion chambers 46 of the motor.

For supplying fuel to the motor I employ any suitable system comprising a float-controlled fuel container as indicated at 48, in combination with a plunger chamber 49. The plunger chamber is employed for the purpose of temporarily raising the level of the fuel in the carbureters in order to enrich the mixture temporarily.

The fuel passes from the container through a pipe section 50 into a tube 51 to suitable carbureters as 52.

Figure 11:
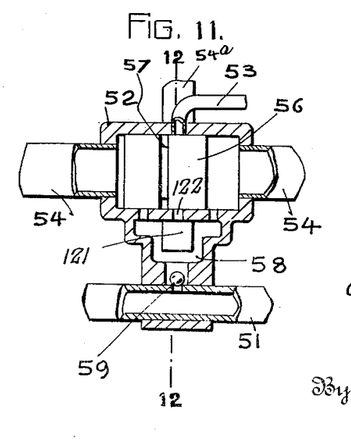
Fig. 11 is a cross-sectional view taken on the line 11—11 of Fig. 1, through the carbureter.
Figure 12:
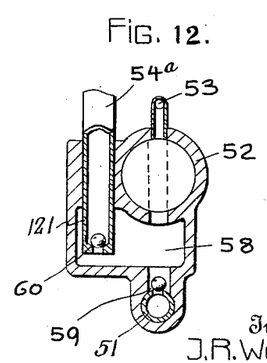
Fig. 12 is a cross-sectional view taken on the line 12—12 of Fig. 11.

Each of the four motors comprising the power unit is two cycle in its operation and each is provided with a combustion chamber 46 which is supplied with fuel from the corresponding carbureter 52 by means of air pressure. The mechanism for accomplishing this is shown in Figs. 11 and 12 and more or less diagrammatically in Fig. 2. Referring to Fig. 2, the combustion chamber 46 is provided at one end with air and fuel inlet passages 115 and 116, respectively, and at its opposite end with corresponding air and fuel inlet passages 117 and 118. The air inlet passages are in communication with the compressed air pipe 53 and the fuel inlet passages are in communication with the fuel pipes 54a leading from the carbureter 52. These inlet passages are controlled by the sleeve valve 55 which is provided with suitable ports 119 and 120. The valve 55 is mechanically operated as will presently appear.

Figure 4:
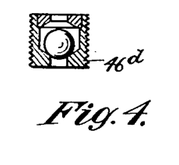
Fig. 4 is an enlarged sectional view of a check valve employed in my motor construction.

The combustion chamber 46 is provided with a piston 46c which is operated by compressed air for removing the products of combustion from the chamber 46 after the explosion occurs. The sleeve valve 55 and the piston 46c are lubricated in any suitable manner. As shown, oil is pumped to the valve 55 through the pipe 46e and the valve 55 is provided with an oil chamber and a check valve 46d, see Figs. 2 and 4, through which the piston 46c is lubricated. The check valve prevents excessive lubrication and at the same time will be opened by the reciprocation of the sleeve to permit the oil to flow past the same onto the periphery of the piston 46c.

With the parts in the position shown in Fig. 2, compressed air from the pipe 53 and passage 117 will enter the port 120 at the right of the piston 46c and move the same toward the left thereby forcing the products of combustion out of the chamber 46 into the cylinder 9. The movement of the sleeve 55 to the left in Fig. 2 will close the passage 117 and will open the fuel passage 118 for an instant in order to permit a charge of fuel to be forced by compressed air along the fuel passage 118, into the chamber 46 at the right of the piston 46c.

The mechanism for forcing or spraying the fuel into the chamber 46 will now be described. The carbureter 52 comprises a fuel chamber 58 which is in communication with the fuel supply pipe 51 through the port and check valve 59. The inner ends of the pipes 54a are connected to the pipe 121 which extends downward into the fuel chamber 58 and its lower end is normally slightly below the fuel in said chamber. The fuel is forced upward through the pipe 121 at intervals by means of compressed air from the pipe 53. The air intermittently enters the chamber 58 through the port 122 which is opened and closed by the sliding valve 56. The valve 56 is provided with an annular recess 57, through which the air passes when the same is in alinement with the inner end of the pipe 53 and the port 122.

When the compressed air enters the chamber 58 it forces the fuel through the pipe 121 until the level falls below the end of the pipe when the air will pass along the pipe 121 into the chamber 46 thereby relieving the pressure in the chamber 58.

The sliding valve 56 is in the form of a piston and is operated by air pressure in the following manner. The chamber 46 terminates in annular extensions in which the ends of the sliding valve 55 operate as pistons. When the valve 55 is moved toward one end of the chamber the air in the annular chamber at that end is compressed and is forced through the pipe 54 to move the valve 56 in the opposite direction. This movement of the sleeve valve 55 will also create a partial vacuum in the annular chamber at the other end which will release the pressure on the opposite side of the sliding valve 56. Suitable ports at each side of the port 122 may be provided for equalizing the pressure between the air and fuel chambers. A check valve 60, see Fig. 12, in the lower end of the pipe 54a prevents the return of air or fuel to the chamber 58.

Suitable means are provided for scavenging the cylinders after each explosion. Each cylinder is provided with a chamber 34, see Figs. 1 and 8, into which air from the passage 36 may enter through the valve 37a. The chamber 34 is provided with two ports 124 and 125 through which the air is drawn when the piston, as for instance the piston 6, is moved outward. When the piston 6 moves inward, the air is compressed until the piston passes the port 124 when the air in the inner end of the cylinder 9a will escape through the port 124 outwardly of the piston and blow the exploded gases into the exhaust which has previously been opened. While the air is scavenging the cylinder the piston 46c forces the exploded gases from the combustion chamber 46 into the corresponding cylinder, see Fig. 2. If desired, an atomizer 9c in communication with the water jacket 9b may be employed for moistening the air drawn in through the valve 37a.

Figures 14, 15, 16, 17, 18, 19:
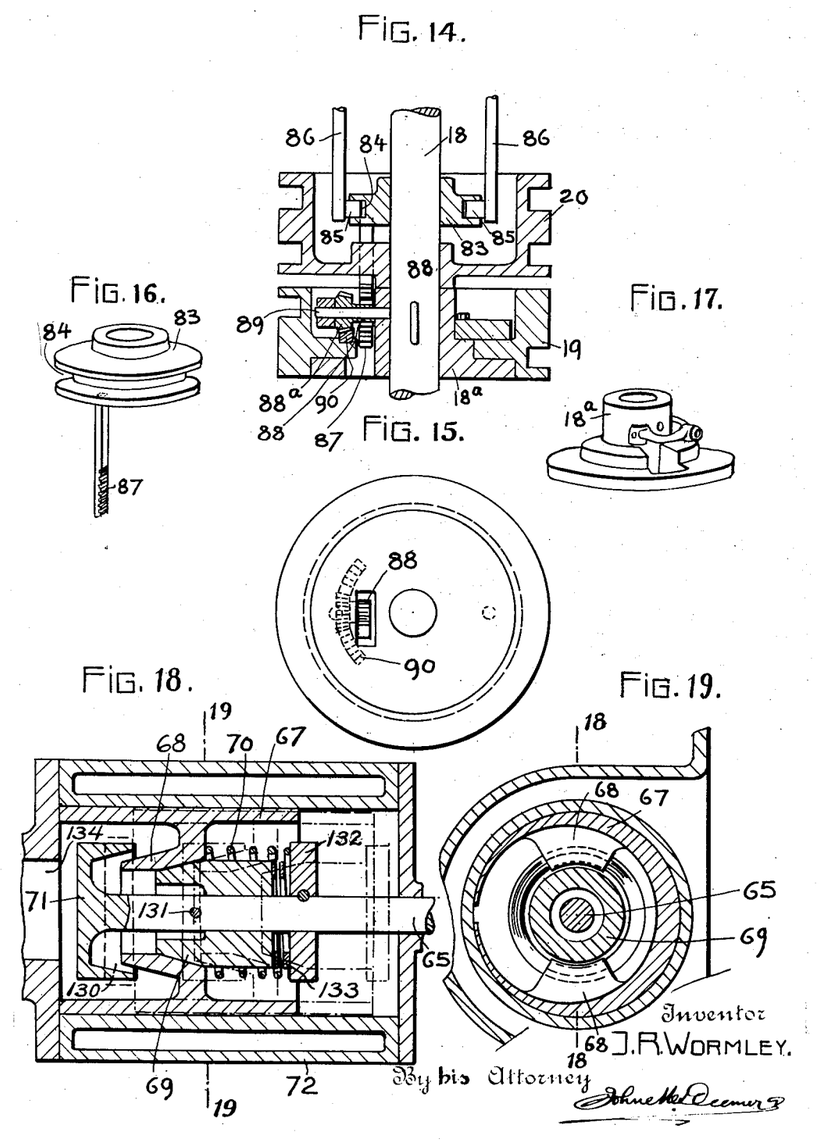
Fig. 14 is a fragmentary vertical sectional view taken on the line 14—14 of Fig. 5.
Fig. 15 is a plan view of the detail illustrated in Fig. 14, with the shaft and cam wheel adjusting sleeve removed for the sake of clearness.
Fig. 16 is a perspective view of the cam wheel adjusting sleeve.
Fig. 17 is a perspective view of the cam wheel hub.
Fig. 18 is a detail sectional view of the exhaust valve and associated parts, taken on the line 18—18 of Fig. 1.
Fig. 19 is a cross-sectional view taken on the line 19—19 of Fig. 18, with parts broken away.
Figure 20:
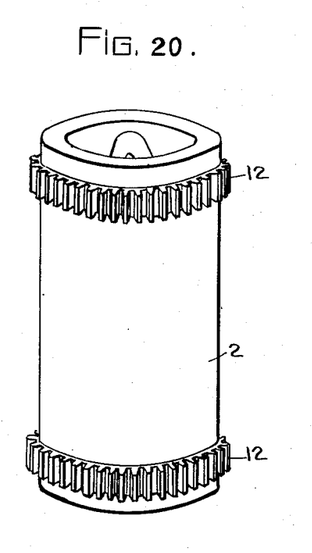
Figs. 20 and 21 are perspective views, respectively, of the rotor and plunger elements of my invention.
Figure 21:
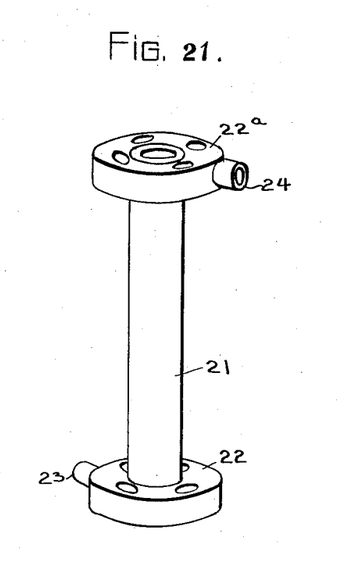
Figure 22:
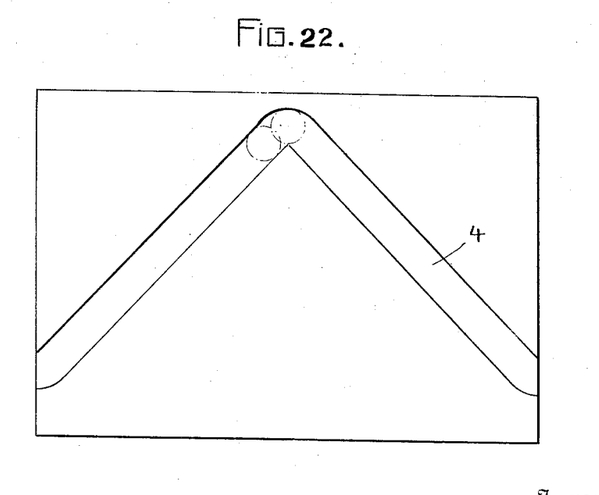
Fig. 22 is an inside diagrammatic view of the rotor element.

Each of the four cylinders 9a, 9, 9a and 9 is provided with an exhaust port 130 (see Figs. 1 and 18). These ports are controlled by the exhaust valves 61, 62, 63 and 64 slidably mounted in the cylindrical casings 72 mounted on the ends of the cylinders. Each casing 72 is provided with an opening 134 in its outer end for the escape of the exhaust. Each valve has a stem 65 by means of which the valves are mechanically operated for opening and closing the ports 130 as will presently appear. Each valve is in the form of a split cylindrical sleeve 67 slidably mounted in the casing 72, see Fig. 18.

Suitable means are provided for expanding the sleeve 67 when it is moved in a direction to close the port 130 and to contract it when moved in the opposite direction, whereby it will make a gas-tight fit in the cylinder and prevent leakage of the exhaust gases during the power stroke of the piston, and will be contracted when moved inward to open the port 130. As shown, the sleeve 67 is provided with inwardly extending projections 68 forming a conical recess which is adapted to be engaged by the conical end of an expander member 69 for expanding said sleeve when the same is moved toward the left, as shown in Fig. 18. The expander member 69 is mounted on the valve stem 65 and is limited in its outward movement by the pin 131 and in its inward movement by a stop 132. Preferably a spring 133 is interposed between the stop 132 and the member 69 to cushion the blows of the stop member 132 against the expander 69 during the operation of the device. A spring 70 may also be inserted between the stop 132 and the projections 68 for assisting in releasing the expander member 69 from the sleeve at the beginning of the return stroke.

In order to avoid undue friction of the parts, it is desirable to contract the sleeve valve 67 on the return stroke. As shown more particularly in Fig. 18, the outer end of the stem is provided with a head 71 having a conical recess for receiving the tapered ends of the projections 68.

In the operation of the device, when the stem 65 is moved outward or toward the left in Fig. 18, the tapered end of the expander member 69 will expand the sleeve for making a gas-tight valve, and on the inward movement or movement toward the right in Fig. 18 the tapered portion of the projections 68 engaging in the conical recess of the head 71 will contract said sleeve whereby it may more readily be moved to inoperative position.

Figures 5, 6, 7:
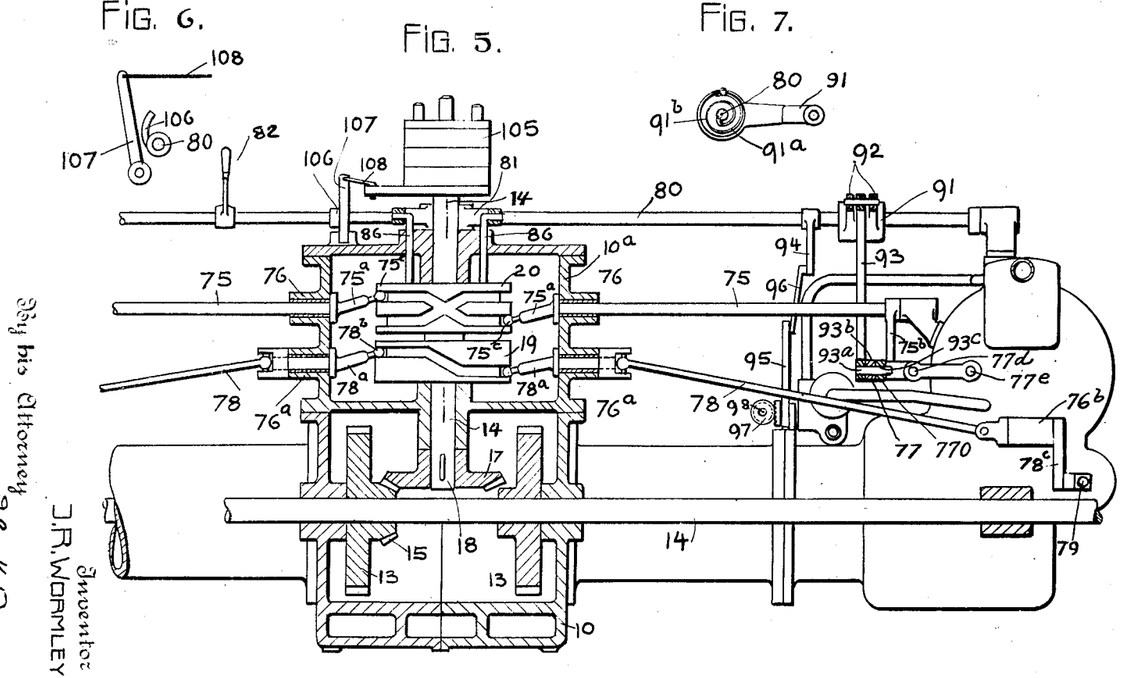
Fig. 5 is a longitudinal sectional view taken on the line 5—5 of Fig. 1.
Figs. 6 and 7 illustrate fragmentary details of the construction.

The cam wheels 19 and 20, see Figs. 5, 13 and 14, are adapted during their rotation to operate the sleeve valves 55 of the compression chambers 46 and also the exhaust valves 61, 62, 63 and 64 in a manner that will now be described.

The cam wheel 20 operates the sleeve valves 55, see Figs. 5 and 13, by means of rocker-shafts 75 which are journaled through boxes 76 of the casing 10a which is mounted over the gear case 10, said rocker-shafts 75 having respectively an angular arm 75a, provided with a roller-bearing 75c, which engages the groove of the cam 20, and a laterally extending arm 75b which is connected with the sleeve valve 55 through the valve operating rods 77 and 770 as will presently appear, whereby rocking movement imparted to the rocker-shaft 75 by the rotation of the cam wheel 20 imparts reciprocating movement to the sleeve valves 55.

The exhaust valves are operated respectively, by means of a rockershaft 78 journaled through a box 76a of the casing 10a and having an angular arm 78a provided with a roller bearing 78b, for engaging the cam groove of the cam wheel 19, and an arm 78c for engaging a reciprocative member 79 connected with the valve stem 65, said rocker-shafts 78 being jointed with their outer sections journaled in boxes 76b.

As a means for relatively adjusting the cam wheels whereby they may be maintained in proper relation for regulating the timing of the valves to vary their movements, I provide a shaft 80, see Fig. 5, having a laterally extending forked arm 81 and an operating lever 82, said forked arm connected with a sleeve 83, see Fig. 14, having an annular groove 84 which engages bearings 85 of rods 86 connected to said forked arm 81. Depending from the sleeve 83 is a rack-arm 87 which meshes with a pinion 88 formed integral with a bevel pinion 88a mounted on a horizontal spindle 89, said bevel pinion 88a meshing with a segmental rack 90, whereby swinging movement of the lever 82 imparts rotary movement to the cam 19, for angularly adjusting said cams for varying the relative times for opening and closing the exhaust valves. The cam wheel 19 is rotatable on a hub 18a which is keyed to the shaft 18, whereby said cam wheel may be given independent rotary movement, as above described for angularly shifting the grooves for advancing or retarding the movement of the exhaust valves relative to the engine pistons, whereby the exhaust valve may be opened at the end of the expansion stroke or before that time as desired.

Suitable means are also provided for varying the stroke of the sleeve valves 55 whereby the ports 119, 120 will be only partially opened for admitting compressed air to the combustion chambers 46 during the operation of the device, see Figs. 2 and 13.

As shown more particularly in Figs. 5 and 13, the shaft 80 is provided adjacent each end with a laterally extending arm 91 having a fork 92 at its outer end in which is pivoted the upper end of the link 93. The arm 91 is provided with a hub 91a, Fig. 7, which is journaled on the shaft 80 and held from turning by the spring 91b which is adapted to cushion the movement of the arm 91 when the shaft 80 is partially rotated. Since this mechanism for varying the stroke of the sleeve valve is duplicated at each end of the device, that shown in Fig. 5 and at the top of Fig. 13 alone will be described.

The lower end of the link 93 is provided with a laterally extending pin 93a, Fig. 5, which engages in loops formed by slots 93b and 93c in the inner ends of the valve operating rods 77 and 770 respectively, for raising and lowering the slotted portion of the operating rods. The rods 77 and 770 are vertically slidable on the arms 75b as by being provided with apertures or short slots 77a and 77c through which the free ends of the arms 75b extend as shown in Fig. 13. By means of this arrangement the rockshaft 80 may be moved in a direction to lift the link 93, for instance, which in turn will raise the loops 93b, 93c, lifting the loop ends of the valve operating rods 77 and 770 along the oscillating arms 75b, thus shortening the stroke of the valves. It will be noted that the valve operating rods 77 and 770 are Z-shape. This is for convenience of construction and for the purpose of so hinging or pivoting the parts together, as at 77d and 77c (see Fig. 5) that the loops 93b and 93c may be raised and lowered without turning the valves 55.

The shaft 80 is further provided with an arm 94, see Fig. 5, which is connected with a segmental rack 95, by means of a rod 96, said segmental rack engaging a bevel-pinion 97 mounted on a laterally extended shaft 98 having mounted on its outer end a gear wheel 99, see Fig. 13, which meshes with a similar gear wheel 100 fixed to the outer end of the needle valve 44, whereby said needle valve may be adjusted for controlling the amount of compressed air supplied to the cylinders 9 and 9a. The shaft 98 is further provided with a bevel pinion 101 which meshes with a similar bevel pinion 102 of a longitudinal shaft 103 having a worm wheel 104 for adjusting a plunger in the container 49, for the purpose of regulating the fuel supply coincidentally with the regulation of the air supply and the adjustment of the valve movements. For instance, on starting the engine the rod 80 is turned in a direction to open the valve 44 and simultaneously depress the plunger in the container for momentarily forcing an additional supply of gasoline to the carburetors 52, which in turn supply additional gasoline to the charge.

My system is also provisioned with a distributor and timer, as 105, see Fig. 5, adapted to be operated by a cam 106 mounted on the shaft 80, said cam operating against a swinging lever 107 connected to the timer by means of a rod 108.

The engine is of the two cycle type and since there are four cylinders arranged in pairs, there is a power stroke as each piston moves inward toward the transverse axis of the engine. The pistons of the two cylinders 9 are always in the same phase as are those of the cylinders 9a, consequently the two piston rods move in opposite directions.

In the operation of the device, assuming that the parts are in the position shown in Fig. 2 of the drawing, the explosion has occurred in the chamber 46 at the upper right side of Fig. 2, and the piston in the cylinder 9 at the right of Fig. 2 and the piston 5 in the cylinder 9 at the left in Fig. 1 which operate in the same phase are nearing the limits of their power stroke or inward movement. The pistons 6 are nearing their outward limit of movement. As soon as the pistons for the cylinders 9 have reached the limit of their inward or power stroke the exhaust valves are opened, and air compressed in the chamber 34 passes the ports 140 and scavenges the cylinders 9. Simultaneously with this operation, compressed air will enter the chambers 46, see Fig. 2, through the passages 117 and 120 and force the piston 46c to the left, which in turn will displace the products of combustion in the chambers 46, see Figs. 2 and 13.

Just before reaching the outward limit of movement of the pistons 5 in the cylinders 9 the exhaust ports 130, see Figs. 1 and 18, for these cylinders, suddenly close, the valves 55 of the cylinders 9 are suddenly moved to their inner position to uncover the fuel passages 118, see Fig. 2, and to bring the outer ends of the chambers into communication with the cylinders 9, after which the charge is fired and the cycle is complete.

The mechanism connected with the cylinders 9a, 9a operate simultaneously in the same manner as the mechanism for the cylinders 9, 9, that has just been described, except that the pistons operate in opposite phase.

Having thus described my invention, what I claim as new and desire to secure by Letters Patent, is:—

1. In an engine assemblage of the character described, a plurality of cylinders arranged in pairs, a pair of pistons for each pair of cylinders, a common piston rod for each pair of pistons, a power shaft, means for operating said shaft from said rods, said means comprising a stator member and a rotor member, each of said members having spiral internal grooves, heads on said rods engaging said grooves, and means for giving an expansive fluid impact to each piston at its outward limit of travel for forcing the same inward for operating said power shaft.

2. In an engine assemblage of the character described, a pair of aligned cylinders, a piston in each cylinder, a common piston rod for said pistons, a power shaft, means comprising a spirally grooved rotor and stator and a plunger engaging said grooves for causing said power shaft to make a complete rotation for each stroke of said piston rod, and means for giving an expansive fluid impact to each piston at its outward limit of travel for forcing the same inward for operating said power shaft.

3. In a two cycle combustion engine, four cylinders arranged in pairs, the cylinders of each pair being arranged in alinement, pistons in each cylinder, the pistons of each pair of cylinders having a common piston rod, each pair of pistons being adapted to be moved in opposite directions in said cylinders, means for supplying an expansive fluid to the outer end of each cylinder for forcing the pistons inwardly, a power shaft, and means including a spirally grooved stator and rotor and a plunger engaging said grooves, for each pair of cylinders and operated by said pistons for imparting a complete rotation to said shaft for each stroke of one of said piston rods.

4. An engine assembly of the character described, a plurality of cylinders arranged in pairs, a pair of pistons for each pair of cylinders, a common piston rod for each pair of pistons, said rods being adapted to be reciprocated in opposite directions, a power shaft parallel with said rods, means for operating said shaft from said rods, said means comprising a stator member and a rotor member for each pair of pistons, each of said members having spiral internal grooves, a plunger member rotatably mounted on each of said rods and having lateral projections for engaging said grooves, means for giving an expansive fluid impact to each piston at its outward limit of travel for forcing the same inward for operating said power shaft.

5. In a two cycle combustion engine, a pair of alined cylinders, a piston in each cylinder, a common piston rod for said pistons, a rotor element rotatable about said rod, said rotor having an endless spiral groove on its inner surface, a stator having an endless spiral groove on its inner surface, a plunger element having laterally extending projections at its ends on opposite sides thereof, engaging said grooves, a power shaft, gears on said shaft and rotor for rotating said shaft when said rod is reciprocated, an exhaust valve for each cylinder, and means for regulating the movement of said valve relative to the movement of the corresponding piston.

Signed at Ransom, in the county of La Salle and State of Illinois, this 4th day of February, A. D. 1922.

JONATHAN R. WORMLEY.